United States Patent [19]
Choudhury et al.

[11] Patent Number: 5,886,898
[45] Date of Patent: Mar. 23, 1999

[54] COMPUTER ASSISTED METHOD FOR CONDUCTING LIBRARY RESEARCH FROM A REMOTE LOCATION AND ASSOCIATED APPARATUS

[75] Inventors: Sayeed Choudhury; Louis Whitcomb, both of Baltimore; Todd Kelley, Columbia, all of Md.

[73] Assignee: The Johns Hopkins University, Baltimore, Md.

[21] Appl. No.: 835,944

[22] Filed: Apr. 11, 1997

[51] Int. Cl.[6] .............................. G06F 19/00; G06F 17/60
[52] U.S. Cl. ................................ 364/478.06; 379/93.25; 379/100.11; 395/80; 705/27
[58] Field of Search ........................ 364/478.02, 478.03, 364/478.06, 479.02, 479.03, 479.04; 348/13–20; 705/26, 27; 379/93.12, 93.25, 100.11; 707/104; 395/80, 84; 414/273

[56] References Cited

U.S. PATENT DOCUMENTS

| | | | |
|---|---|---|---|
| 4,806,066 | 2/1989 | Rhodes et al. | 414/729 |
| 5,319,542 | 6/1994 | King, Jr. et al. | 705/27 |
| 5,721,832 | 2/1998 | Westrope et al. | 705/27 |
| 5,727,048 | 3/1998 | Hiroshiima et al. | 705/27 X |
| 5,761,649 | 6/1998 | Hill | 705/26 X |

OTHER PUBLICATIONS

Werner Holzbock, "How Robots Pick Things Up", *Machine Design*, Apr. 9, 1987, pp. 52–56.

Richard Schneider, "Micro–Cameras Direct Fruit Picking Robot", *Hydraulics & Pneumatics*, Feb. 1990, p. 10.

"Automated Storage & Retrieval System" California State University Northridge Internet (4 pages) (Believed to be prior art. Date of publicaiton not known to applicant.); date unknown.

*Primary Examiner*—Joseph Ruggiero
*Attorney, Agent, or Firm*—Arnold B. Silverman; Eckert Seamans Cherin & Mellott, LLC

[57] ABSTRACT

A computer assisted method for conducting library research from a first location which is remote from the printed work storage location includes identifying at the first location a book to be viewed and delivering the request through computers and telecommunications apparatus to the book storage location followed by delivering the book to a book viewing station and remotely reviewing digital images of at least portions of the book created by a digital imaging system. The computer is programmed to permit a user at the first location to adjust the digital imaging system at the second location and to identify pages of the book to be viewed. Robots may be employed to deliver the book to the book viewing station from the book storage area and to return the book from the book viewing station to the book storage area. Hard copies of the digital image of one or more pages of the book may be made at the first location. Instructions after viewing the book at the book viewing station may be provided from the first location to request return of the book to the book storage area or delivery of the book to a location other than the book storage location. A robot may be employed to turn the pages of the book. Corresponding apparatus is also disclosed.

28 Claims, 3 Drawing Sheets

COMPUTER ASSISTED METHOD FOR CONDUCTING LIBRARY RESEARCH FROM A REMOTE LOCATION AND ASSOCIATED APPARATUS

BACKGROUND OF THE INVENTION

1. Field of the Invention

The present invention is directed toward a computerized method of conducting research employing hard copy books and other printed works which are disposed at a location remote from the researcher and also to apparatus capable of facilitating such research.

2. Description of the Prior Art

In the days prior to widespread use of computers, substantially all library materials were in the form of printed hard copy books, journals and related materials. As the volume of such materials has increased over the years, storage of the same has become a significant problem. Libraries are frequently confronting a problem of limited shelf-space in readily accessible library areas and the need to store books for retrieval in inconvenient off-site storage facilities.

In recent years, both on-line computerized research capabilities and the ability to obtain information stored on magnetic media, such as CD-ROMs, have caused a lot of library funds to be expended for computer equipment, on-line access charges and materials provided on magnetic storage media rather than in hard copy.

While the technology exists for digital scanning of hard copy to permit storage on magnetic media, the economics of attempting to convert substantial libraries, such as university libraries and other libraries, including corporate libraries, makes it impractical to employ such an approach. Also, the copyright laws impose certain restrictions on the legal right to reproduce materials unless such reproduction is "fair use" in the context of United States copyright laws.

While moving the hard copy books to off-site storage locations is an approach to solving the problems, such works are rendered less accessible as a result of the off-site storage. Typically, researchers are not permitted to have access to the books at the storage site, but rather can obtain delivery of a hard copy work within 24 hours. Also, the delivery and return service involves a cost.

Numerous automated robot systems have been employed to locate and deliver a wide variety of warehouse stored items. These systems may provide an automated vehicle which moves in a predetermined path which may have rails or may not depending upon the system employed. Optical scanners may be employed to locate a particular bin containing the items to be delivered. Bar codes may be employed to facilitate robot arrival at the storage location. The robots may have hydraulically actuated robot arms with suitable means for engaging and removing a bin from a shelf followed by robot delivery of the bin to the desired location. See, generally, U.S. Pat. No. 4,806,066, "How Robots Pick Things Up," Machine Design, pp. 52–56, April, 1987, and "Micro-Cameras Direct Fruit-Picking Robot" Hydraulics & Pneumatics, p. 10, February, 1990.

California State University Northridge in 1991 initiated use of a railed "mini-load" crane, which is responsive to an on-line catalog selection by a user, causing a crane to retrieve a bin containing the desired book and delivering it to an operator. The operator removes the book from the bin, checks the book out and delivers it to an electric track vehicle for delivery to a circulation counter. See http://www.csun.edu/~vfoao0hf/asrs.html. This system does not involve remote viewing of a book by digital transmission or the ability to select portions for remote viewing.

There remains a need for dealing with the economic problems and the need to provide prompt access to hard copy works. Libraries are facing a particularly troublesome problem in respect of older books which were not available previously through modern computerized and electronic means.

SUMMARY OF THE INVENTION

The present invention has met the above-described need. The invention provides a computerized method of conducting library research which includes identifying at a first location a printed work, such as a book, for viewing and delivering a request by computer means to a storage location disposed remotely from the first location. The printed work is then delivered to a viewing station at the storage location and remotely reviewed from the first location through a digital imaging system which provides a digital image which is delivered through telecommunication means to the first location.

First computer means at the first location are programmed so as to facilitate user viewing of an on-line catalog and delivering identification of a printed work desired to be viewed to second computer means which are disposed at the printed work storage location. The printed work is located at the printed work storage location and may be removed from a printed work storage area and delivered to a printed work viewing area. The printed work may be opened and pages turned in accordance with a request from the user located at the first location. If desired, robots may be employed to automate all or portions of the printed work delivery, viewing and return to the printed work storage area. A digital imaging system, in a preferred embodiment, is positioned generally in overlying relationship with respect to the printed work which is located at the printed work viewing station and is controlled by the user through the first computer means. The first computer means also provides instructions as to what pages are to be viewed. After viewing, the user may make hard copies of the digitally presented pages by means of a printer associated with the first computer means, may request that the printed work be delivered to a building other than the printed work storage location or may request that the printed work be returned to the printed work storage area.

The apparatus of the present invention includes first computer means disposed at a first location remote from the printed work storage location and second computer means disposed at the printed work storage location. The first computer means is programmed to communicate with the second computer means by telecommunications means. The first computer means is programmed so as to provide appropriate output to the second computer means regarding printed work identification, digital imaging system manipulation and adjustment, delivery of the printed work to the printed work viewing station and return to the printed work storage station or delivery to another location. If desired, robots may be employed to automate activities at the printed work storage location.

It is an object of the present invention to provide a method and associated apparatus for conducting library research on printed works, as hereinafter defined, through the use of computerized input from a first location to a storage location where the stored printed works may be withdrawn from the printed works storage area and viewed by means of an appropriate digital imaging system.

It is a further object of the present invention to facilitate efficient use of off-site storage of hard copy books while not involving the delay generally inherent in getting access to such stored works.

It is another object of the present invention to permit the user to have interactive real-time review of a printed work and flexibility as to what portions of the work will be viewed and whether the book should be delivered to a site other than the storage location for direct viewing or creating a hard copy of the image transmitted to the first computer means by a digital imaging system by way of the second computer means and telecommunications means.

It is a further object of the present invention to provide a computer assisted system which will permit interactive real-time visual access to printed works stored in remote locations.

It is another object of the present invention to provide such a system wherein there is no need to provide cameras, microphones or other unusual hardware at the user or first location.

It is another object of the present invention to provide such a system wherein long term storage of digital images is not required.

It is a further object of the present invention to provide such a system which can be employed efficiently by university libraries, industrial libraries, other libraries, and in other situations where access to a hard copy printed work, is desired to be obtained on a real-time basis employing computerized technology.

These and other objects of the invention will be more fully understood from the following description of the invention with reference to the drawings appended hereto.

DESCRIPTION OF THE PREFERRED EMBODIMENT

As used herein, the term "book(s)" means a plurality of hard copy pages, regardless of size containing text, graphics, or both, secured in an assembly as by binding and shall expressly include, but not be limited to books, booklets, pamphlets, journals, magazines and monographs.

As used herein, the term "printed work(s)" means a single page or multiple page work having text, graphics, or both, regardless of whether the pages are secured in an assembly and regardless of whether the text and graphics are applied to the page by printing or other means and shall expressly include, but not be limited to photographs, paintings and other artwork, business records, forms, books (as defined herein), handwritten works and manuscripts.

As used herein, the term "library research" is not limited to use of the system in connection with printed works stored in a library or for research per se, but shall include the general use of the system in connection with remote access to printed works.

Figure 1:
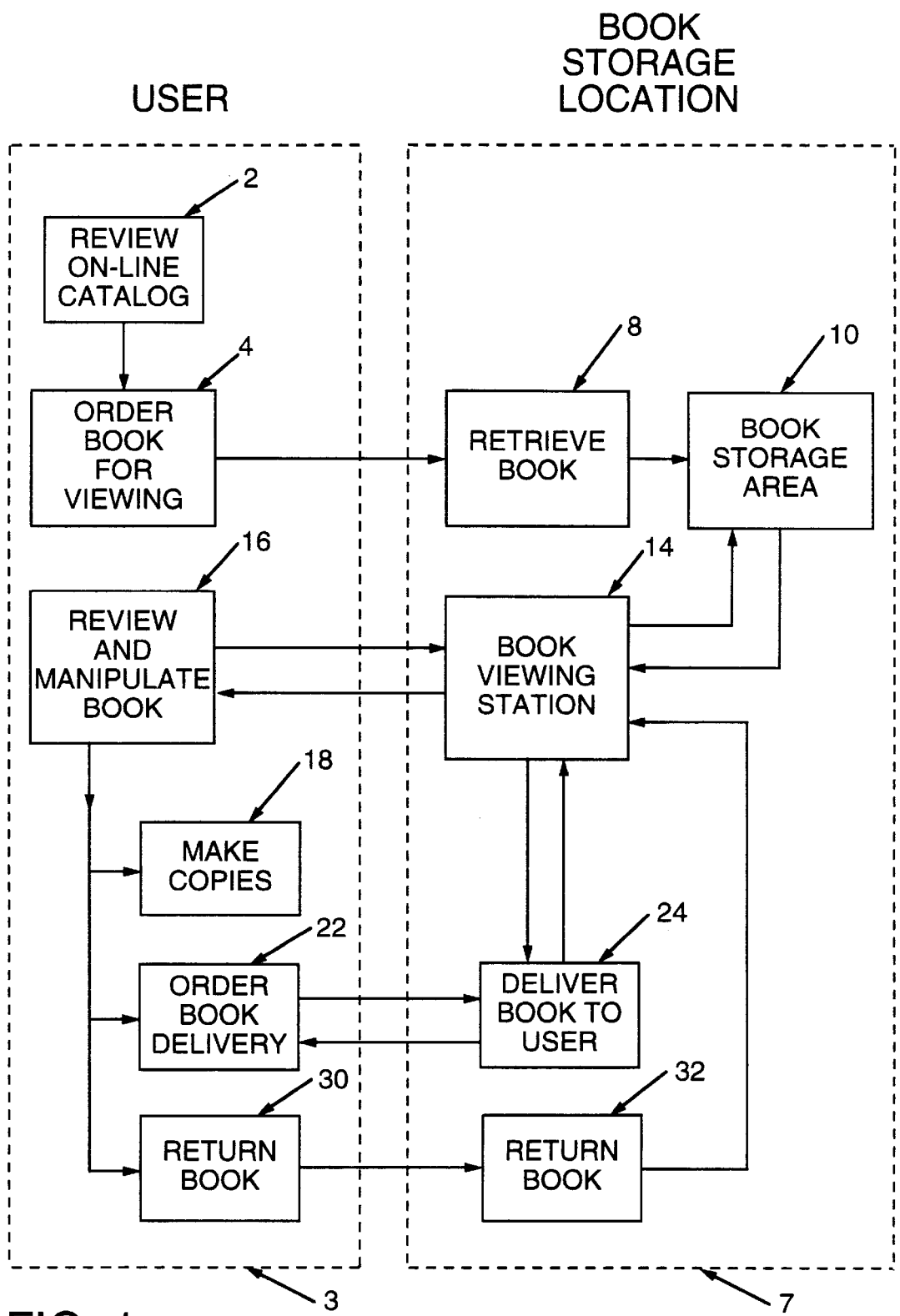
FIG. 1 is a schematic illustration of the sequence of operation of the method and associated apparatus of the present invention in connection with a printed work which is a book.

In considering FIG. 1, the activities going on at the first location which is remote from the book storage location appear in the vertical grouping of blocks positioned toward the left of the page and the activities occurring at the book storage location appear in the vertically stacked items to the right of the page. For simplicity of disclosure, a printed work which is a book, will be employed as an example.

Before turning to the details of the system as shown in FIG. 1, it will be understood that the user will access the system through first computer means 3 (shown schematically by a dashed rectangle) which may be any suitably programmed or configured computer disposed at the first location. The first computer means 3 has communications software to communicate through conventional telecommunications means with second computer means 7 (shown schematically by a dashed rectangle) which is suitably programmed and may be located at the book storage location. As the software per se does not form part of the invention and will readily be available to or may be created by one skilled in the art, details regarding the code are not provided herein, although detailed descriptions of the software functions and the environment, as well as the physical changes effected responsively will be disclosed. The software may advantageously be employed partially within the first computer means 3 and partially within the second computer means 7 and may be employed with a personal computer.

Referring to FIG. 1, a cycle of operation of the system and examples of options that may be available will be considered. The user would initially review an online catalog 2 listing the categories of books and identifying the books that are available. The directory preferably also permits searching by key words. The computer screen will, once a work has been selected, provide an indication of the location of the book. Once a book has been selected for review, the election is entered, generally by identification number, into the first computer means 3 to order the book for viewing 4. This message is delivered to the book storage location where the second computer means 7 receives the instruction to retrieve the book 8. The second computer means 7 will responsively issue a request for retrieval of the identified book. This may be accomplished in a number of ways. The identity may be delivered by first computer means 3 to second computer means 7 to a person who with or without the assistance of equipment retrieves the book and delivers it to the book viewing station 14. If retrieval is to be effected by a robot, the second computer means 7 may deliver the message to the robot which will locate the book in the book storage area 10, remove it from the shelf or other storage location and deliver it to the book viewing station 14 which may typically include a table with a generally horizontal surface on which the book may be opened. The book storage area 10 may typically involve each book or group of books being contained with a separate open top container or bin which has an assigned position on a particular shelf such that it may be readily located and removed from the shelf either with its container or by removing it from its container. In general, the container or bin which may be made of a durable material, such as steel, will be removed from the shelf. In the alternative, a human being could be provided with a screen display or printout identifying the book that is requested and retrieve it from the book storage area 10 in order to provide it at the book viewing station 14. The book will be positioned within the book viewing station 14 in accordance with premarked locations to facilitate efficient positioning with respect to the digital imaging system, which may be a digital camera. A person may place the book in the desired position.

At the book viewing station 14, a digital imaging system (not shown) will be so positioned as to be able to take a picture of the book page or pages of interest, convert the same into a digital image and transmit it to the user for display in real-time on the monitor of the first computer means 3 as indicated generally by the reference number 16.

The book may be opened and pages turned by a person or by means of a robot which has an optical scanner operable responsive to information provided by the user and inputted into the first computer means 3 which, in turn, would deliver the information over telecommunication means to the second computer means 7. Where a human is opening the book and turning the pages, the second computer means 7 may provide a screen display or hard copy of the user's request. It will be appreciated that this system does not involve prolonged storage of a digitized image of the pages, but rather involves real-time access with certain options available to the user. Among the options available to the user are the printing of copies from the digitized computer image at the first location. The first computer means 3 may make the selected copies to thereby provide the researcher with the information needed. In the alternative, the researcher may order the book for delivery 22 to the first location or to another site other than the book storage location. In the event of that option, the second computer means 7 receives an instruction to deliver books to the book user 24 and a corresponding request is communicated to the book viewing location 14. The user may also conclude that the book can be returned 32 to the book storage area 10 in which case the first computer means 3 delivers an appropriate message to the second computer means 7.

For convenience of reference herein, the segmented box identified by the reference number 3 relates to the first computer means and the segmented box identified by the reference number 7 identifies the second computer means. The connecting lines and arrows between the first computer means 3 and second computer means 7 symbolically refer to telecommunications. In a preferred embodiment of the invention, the Internet may be employed as an efficient means for permitting user access. Other known means, including Intranet, LAN or WAN may be used. A user friendly web page on the World Wide Web may be provided for accessing the second computer means.

Figure 2:
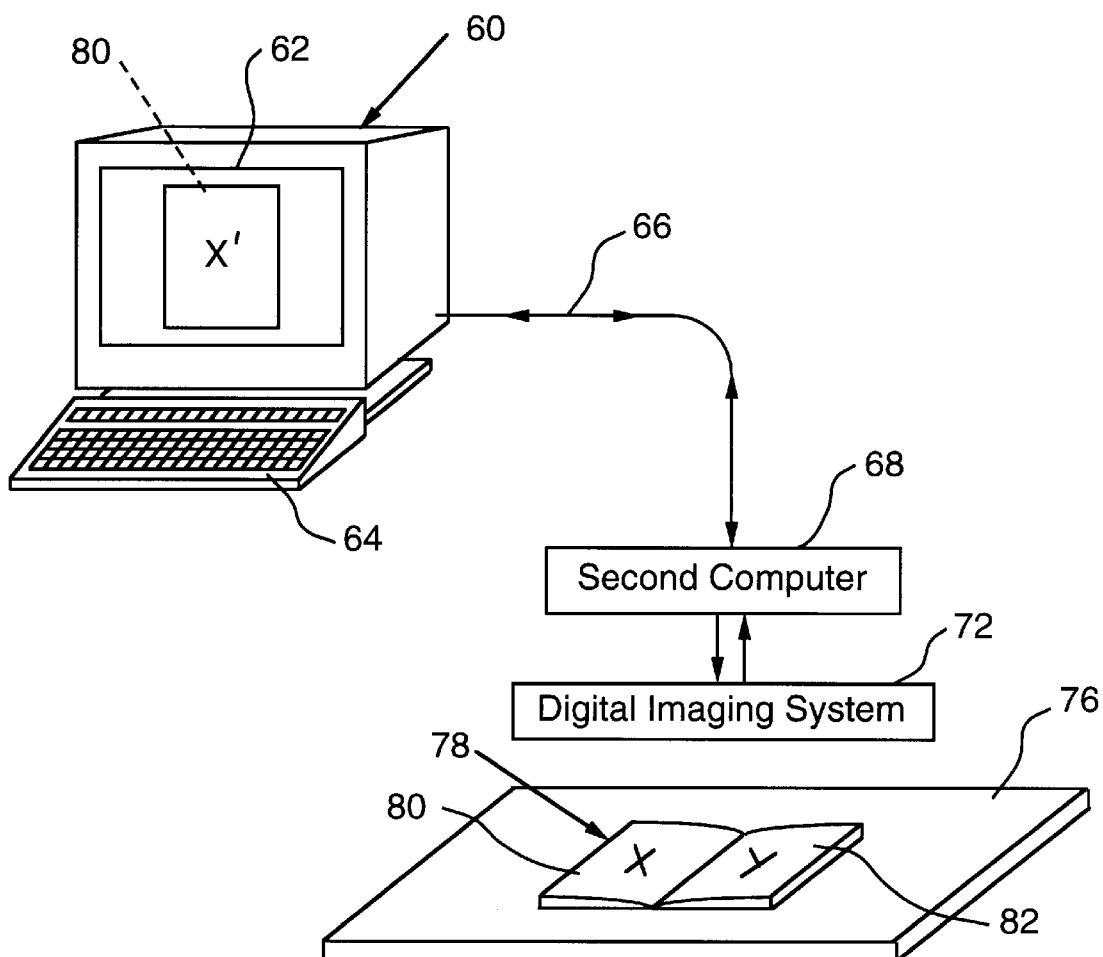
FIG. 2 is a schematic illustration of a portion of the equipment employable in the system of the present invention.

Referring to FIG. 2, the digital imaging system arrangement and controls will be considered. The first computer means 60 may be a personal computer or other suitable general purpose computer specifically programmed to perform its functions in the present system. The computer has a monitor 62 and a keyboard 64. The computer is connected by telecommunications means 66 with second computer means 68 which is, in turn, operatively associated with digital imaging system 72 which overlies the book viewing station 76 on which a book 78 is supported. The digital imaging system 72 may be a digital camera or other suitable means for scanning and digitizing an image on a page or pages of a printed work and transmitting it to the first computer means 60 by second computer means 68 and telecommunication means 66. Another suitable digital imaging system is a planetary scanner. The book 78, in the form shown, is open to pages 80, 82 which have text or graphics or combinations thereof identified respectively as "X" and "Y." In operation, the user employing first computer means 60 may cause the digital imaging means to scan pages 80,82 so as to provide the desired image of a particular page or pages. In the example illustrated, the digital imaging system 72 has been focused on page 80 and by scanning creates a digitized image of the page 80 which is transmitted to first computer means 60 by way of second computer means 68 and telecommunications means 66. produces image 80' on the computer monitor 62 with the content being X'. The first computer means 60 will also have the capability of receiving a high resolution, high quality digitized images corresponding to the initial image from the digital imaging system. The user can by the first computer means 60, determine whether to transmit all of the image obtained by the digital imaging system 72 or only a portion thereof. The first computer means 60 will have software also enabling the user to receive only a portion of the transmitted image or to manipulate the digitized image in known ways as by varying image quality, image size, image rotation, altering the portion of the image displayed, or other desired parameters. The image manipulation may be effected at the storage location by the user at the first location through second computer means, or by the first computer means, or both.

It is preferred that the digital imaging system 72 be capable of providing the desired high quality digital image delivered through a digital data stream over the telecommunications means 66. The digital imaging system 72 typically may have charge-coupling devices to create the digital image which may be stored in a memory card or transferred through second computer means 68 to the first computer means 60. A suitable planetary scanner for use in this system 72 is that offered by Minolta under the trade designation "DPCS 3000." Such a camera may be employed in combination with software which not only facilitates the above-described functions, but also may have software for compensating for page curvature, may detect page edges, and minimize the effect of shadows created by the overlying lamp which provides the appropriate illumination for the camera to function efficiently and portions of the robot or fingers of a worker. The digital imaging system 72 preferably is capable of instantaneously providing a picture of an entire page. It generally will be programmed to automatically adjust for book size and page size. The digital image system 72 should be one which produces a high resolution digital image in a rapid manner which may mean the ability to scan two pages within about 2 to 10 seconds.

Figure 3:
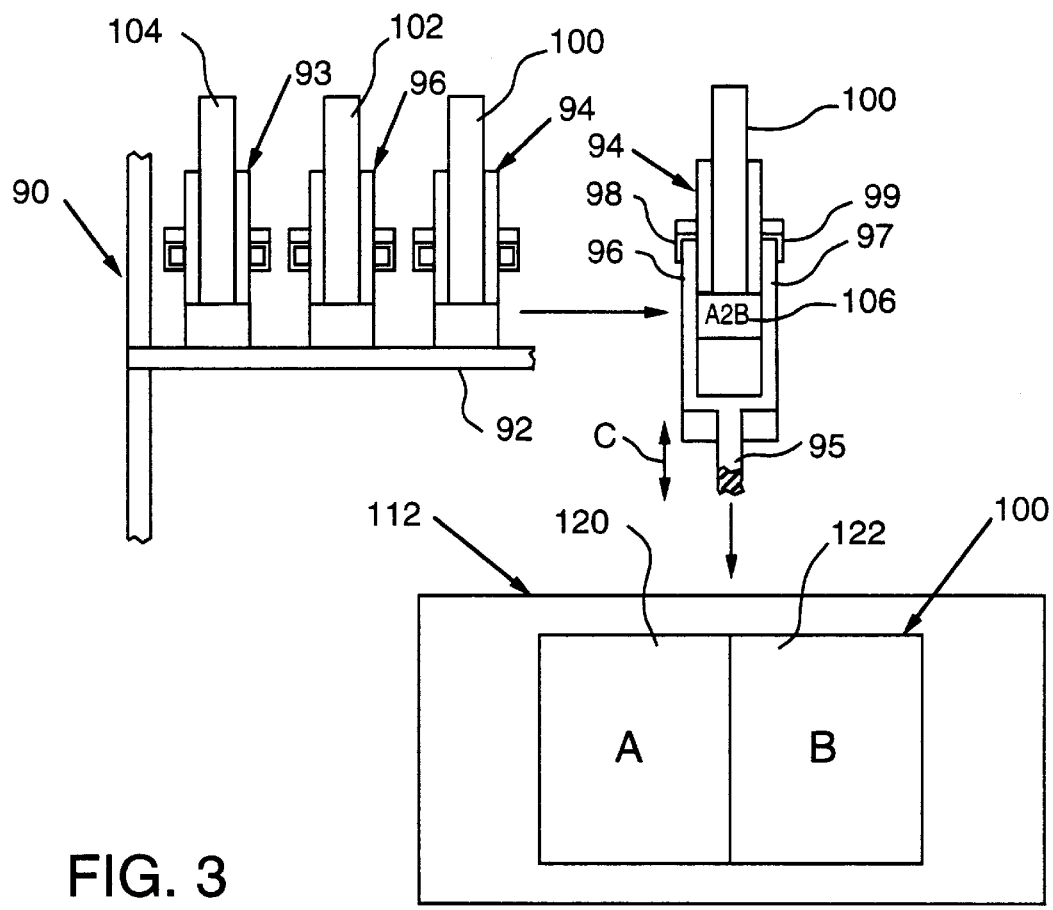
FIG. 3 is a schematic illustration illustrating movement of a book from a shelf storage area to a book viewing table.
Figure 3A:
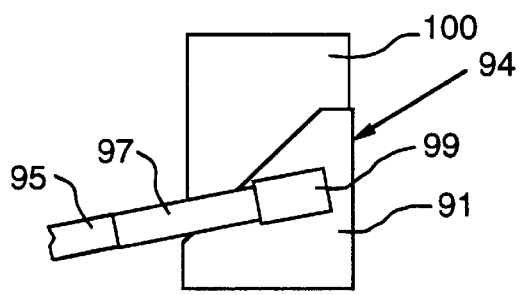
FIG. 3A is a right side elevational view of a book shown in the second position of FIG. 3.

Referring to FIGS. 3 and 3A, there is shown a small portion of the book storage area which has shelving 90 including a horizontal shelf 92 which supports a plurality of upwardly open containers or bins 94, 96, 93, each of which contains, respectively, a book 100, 102, 104. While a single book 100, 102, 104 has been shown in each bin 94, 96, 93, generally, such bins 94, 96, 93 will contain more than one book. The bins may be made of any desired material, such as steel, aluminum or plastic, for example. They may be of any desired size or shape to accommodate the handling system or other shelving storage system and other preferences. For example, a bin might be the size of a laundry basket, hold a substantial number of books, and be stored on open shelves.

The books 100, 102, 104, which may be identified by a suitable code 106 which, in the form shown, has the alphanumeric designation "A2B" positioned on the exterior of the container 94 is removed from the shelf 92 in the container 94. A robot arm 95 has a pair of projecting tines 96, 97 slidingly received within passageways 98, 99 to facilitate engagement with bin 94 and delivery thereof to the book viewing station 112. The robot arm 95 is adapted to reciprocate in the direction shown by arrow C as by a hydraulic actuator. The passageways 98, 99 are angularly upwardly and rearwardly extending and have closed distal ends. FIG. 3A shows sidewall 91 of bin 94 and positioning of closed passageway 99 thereon. The container 94 may be delivered to the book viewing station 112 where it may be removed manually from the container 94 and positioned at the book viewing station 112 open to pages 120, 122 with the printed material on each page being represented, respectively, by the letters "A" and "B." It will be appreciated that this identification through the code 106 and removal from the shelf 92 and delivery of the book 100 at the book viewing station 112 may be accomplished by robots which are programmed to locate the container or book by code, remove the same from the shelf and deliver it to the book viewing station 112. Similarly, responsive to instructions provided either prior to or during scanning of the book 100 received from the user at the first location, the book is opened and the pages are turned to the desired pages thereby permitting the digital imaging system to scan them and deliver a digitized image to the first computer means. If the book locating and delivery functions are performed by a robot, the computer means will be suitably programmed so as to provide for suitable gripping of the bin 94. Numerous forms of robots which operate either on rails or on system-free movement, which are able to scan codes to determine the location where an item is located and to retrieve and to deliver the same, are known. There are also known various types of robots which are capable of grasping and delivering items of different size and weight. These may operate on the concept of tactile feedback in order to determine the amount of force to apply in grasping objects. Such systems could be employed in the present invention. In general, in the present system, it is preferred to have a person manually remove the book from bin 94 at the book viewing station 112 and position the book thereon. The user may indicate the pages to be viewed and the pages may be turned manually or by known automated page turners. This provides an effective computer assisted program. After viewing, if the book is to be returned to the book storage area, it is placed in the bin 94 and returned by the robot.

In a preferred practice of the present invention, an operator removes the book from the bin and places it on the book viewing station. The user, through the first computer means, may request that the book be opened to certain pages. This may be done manually with the operator opening the book and turning the pages. In the alternative, robot arms may be provided with high friction rotatable wheels which would rotate axially as the arm is moved and effect turning of the page. Resilient fingers might be positioned at the free ends of the robot arms for this purpose, if desired. The robot would be suitably programmed to effect page turning responsive to user instructions.

With respect to the software, it will be appreciated that as to certain aspects of the system, the software may be programmed so as to function automatically and where input from the user is required, appropriate menus and fields for entry of responses may be provided in a manner well known to those skilled in the art.

It will be appreciated, therefore, that the present invention has provided an effective method and associated apparatus for employing economically practical offsite storage of printed works while permitting ready access in a real-time mode to the printed works in a computer assisted, semi-automated fashion, as a result of computerized interaction between the first location wherein the user is located and a remote printed work storage location. All of this is accomplished in an economical user friendly manner.

Whereas particular embodiments of the present invention have been described herein for purposes of illustration, it will be evident to those skilled in the art that numerous variations of the details may be made without departing from the invention as defined in the appended claims.

We claim:

1. A computerized method of conducting library research comprising identifying at a first location a printed work for viewing, delivering by first computer means and telecommunication means identification of said printed work to a printed work storage location disposed remotely from said first location, second computer means disposed at said printed work storage location for communicating with said first computer means, delivering said printed work to a printed work viewing station, and remotely viewing through a digital imaging system disposed adjacent the printed work viewing station at least portions of said printed work from said first location.

2. The computerized method of claim 1 including adjusting the digital image output of said digital imaging system disposed at said printed work storage location by output signals from said first computer means.

3. The computerized method of claim 2 including identifying said printed work through access to an on-line catalog.

4. The computerized method of claim 2 including turning pages of said printed work disposed in said printed work viewing station responsive to input from said first computer means.

5. The computerized method of claim 2 including manipulating the digital image from said digital imaging system responsive to signals from said first computer means.

6. The computerized method of claim 1 including subsequent to said printed work viewing issuing instructions from said first computer means to said remote location regarding desired action with respect to said printed work.

7. The computerized method of claim 6 including employing said method on a printed work which is a book.

8. The computerized method of claim 7 including providing said instructions from the group of instructions consisting of returning said book to said book storage area and delivering said book to a location other than said remote location.

9. The computerized method of claim 2 including creating by said digital image system digital images of at least portions of said printed work and delivering said digital images to said first computer means.

10. The computerized method of claim 9 including making at least one hard copy of said digital images at said first location.

11. The computerized method of claim 4 including providing from said first computer means to said second computer means identification of the pages of the printed work disposed in said printed work viewing station to be viewed.

12. The computerized method of claim 1 including employing robot means to deliver said printed work from said printed work storage area to said printed work viewing station.

13. The computerized method of claim 12 including employing robot means to turn the pages of said book.

14. The computerized method of claim 5 including positioning said printed work on said printed work viewing station in a generally upwardly open position with said digital image system being in spaced overlying relationship with respect thereto.

15. The computerized method of claim 1 including employing the Internet in effecting communications between said first computer means and said second computer means.

16. The computerized method of claim 1 including providing identifying code means for each said printed work, and
retrieving said printed work by said code means.

17. The computerized method of claim 1 including said first location being in a different building from said printed work storage location.

18. The computerized method of claim 12 including said robot engaging a container within which said printed work is disposed by inserting tines of a robot into passageways of a container within which said printed work is disposed.

19. The computerized method of claim 18 including said robot arm tines being slidingly received in said passageways.

20. Apparatus for conducting library research comprising
first computer means disposed at a first location remote from a printed work storage location,
second computer means disposed at said printed work storage location,
said first computer means being programmed to communicate with said second computer means by telecommunications means,
said printed work storage location having a printed work viewing station, a cooperating digital imaging system for providing an image of a printed work disposed in said printed work viewing station and a printed work storage area, and
said first computer means being programmed to receive input regarding identification of a printed work and delivering such identification to said second computer means by telecommunications means.

21. The apparatus of claim 20 including
said digital imaging system being a digital camera, and
said first computer means having means to effect responsive manipulation of digital images of said printed work obtained by said digital camera.

22. The apparatus of claim 20 including
said system being structured to deliver and view printed works which are books, and
robot means for delivering identified books from said book storage area to said book viewing station.

23. The apparatus of claim 20 including
robot means for turning pages of said book in said book storage station.

24. The apparatus of claim 20 including
said first computer means and said second computer means communicating through the Internet.

25. The apparatus of claim 21 including
said digital camera being disposed in generally overlying relationship with respect to said book viewing station.

26. The apparatus of claim 20 including
identifying code means secured to said book or container therefor.

27. The apparatus of claim 20 including
said first computer means having means for communicating to said second computer means identification of which portions of said printed works are to be viewed.

28. The apparatus of claim 20 including
said computer means having means for creating hard copies of digitized images received from said printed work storage location.

* * * * *